(12) United States Patent
Fuller et al.

(10) Patent No.: US 8,812,817 B2
(45) Date of Patent: *Aug. 19, 2014

(54) NON-BLOCKING DATA TRANSFER VIA MEMORY CACHE MANIPULATION

(71) Applicant: Microsoft Corporation, Redmond, WA (US)

(72) Inventors: Jeffrey C. Fuller, Redmond, WA (US); Thomas J. Ootjers, Kirkland, WA (US); Bruce L. Worthington, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/931,741

(22) Filed: Jun. 28, 2013

(65) Prior Publication Data

US 2013/0346692 A1 Dec. 26, 2013

Related U.S. Application Data

(63) Continuation of application No. 12/619,571, filed on Nov. 16, 2009, now Pat. No. 8,495,299.

(51) Int. Cl.
*G06F 12/00* (2006.01)
(52) U.S. Cl.
USPC ............ 711/202; 711/118; 711/144; 711/165
(58) Field of Classification Search
None
See application file for complete search history.

(56) References Cited

U.S. PATENT DOCUMENTS

| | | | |
|---|---|---|---|
| 4,819,154 A * | 4/1989 | Stiffler et al. | 714/20 |
| 5,276,851 A | 1/1994 | Thacker et al. | |
| 5,737,564 A | 4/1998 | Shah | |
| 5,781,923 A | 7/1998 | Hunt | |
| 5,809,548 A | 9/1998 | Chang et al. | |
| 6,546,453 B1 | 4/2003 | Kessler et al. | |
| 6,598,128 B1 | 7/2003 | Yoshioka et al. | |

(Continued)

FOREIGN PATENT DOCUMENTS

CN 1617113 A 5/2005

OTHER PUBLICATIONS

Cache coherency explained, http://www.nedprod.com/NedHAL/Cache%20Coherency%20solutions.html, retrieved Aug. 20, 2009, 2 pages.

(Continued)

*Primary Examiner* — Shawn X Gu
(74) *Attorney, Agent, or Firm* — John Jardine; Andrew Sanders; Micky Minhas

(57) ABSTRACT

A cache controller in a computer system is configured to manage a cache such that the use of bus bandwidth is reduced. The cache controller receives commands from a processor. In response, a cache mapping maintaining information for each block in the cache is modified. The cache mapping may include an address, a dirty bit, a zero bit, and a priority for each cache block. The address indicates an address in main memory for which the cache block caches data. The dirty bit indicates whether the data in the cache block is consistent with data in main memory at the address. The zero bit indicates whether data at the address should be read as a default value, and the priority specifies a priority for evicting the cache block. By manipulating this mapping information, commands such as move, copy swap, zero, deprioritize and deactivate may be implemented.

20 Claims, 10 Drawing Sheets

(56) References Cited

U.S. PATENT DOCUMENTS

| | | | |
|---|---|---|---|
| 6,711,650 | B1 | 3/2004 | Bohrer et al. |
| 7,356,647 | B1 | 4/2008 | Andrighetti et al. |
| 2002/0087815 | A1 | 7/2002 | Arimilli et al. |
| 2002/0161972 | A1 | 10/2002 | Talagala et al. |
| 2003/0227801 | A1 | 12/2003 | Battaglia |
| 2005/0015658 | A1 | 1/2005 | Zohar et al. |
| 2005/0108496 | A1 | 5/2005 | Elnozahy et al. |
| 2007/0067604 | A1 | 3/2007 | Elnozahy et al. |
| 2007/0271416 | A1* | 11/2007 | Ahmed .......................... 711/133 |

OTHER PUBLICATIONS

Chinese Office Action in CN App. No. 201080051868.04; Mailing Date: Jan. 17, 2013; App. Filing Date: Oct. 18, 2010; 10 pages.

International Search Report and Written Opinion in PCT App. No. PCT/US2010/053050; Mailing Date: Jun. 30, 2011; App. Filing Date: Oct. 18, 2010; 8 pages.

Kjos et al., Hardware cache coherent input/output-feature of HP PA-RISC architecture implemented with the HP 9000 J/K-class offerings—Technology Information, Hewlett-Packard Journal, Feb. 1996.

\* cited by examiner

FIG. 3A

| Cache | 130 | | Bus 165 | Main Memory | 120 | |
|---|---|---|---|---|---|---|
| Block | Addr. | Data | | | Addr. | Data |
| 0 | 6 | TUV | | | 0 | ABC |
| 1 | 4 | MNO | | | 1 | DEF |
| 2 | 5 | PQR | | | 2 | GHI |
| 3 | 3 | JKL | | | 3 | JKL |
| | | | | | 4 | MNO |
| | | | | | 5 | PQR |
| | | | | | 6 | TUV |

FIG. 3B

| Cache | 130 | | Bus 165 | Main Memory | 120 | |
|---|---|---|---|---|---|---|
| Block | Addr. | Data | | | Addr. | Data |
| 0 | 6 | TUV | | | 0 | ABC |
| 1 | 4 | MNO | | | 1 | DEF |
| 2 | 2 | GHI | ← | | 2 | GHI |
| 3 | 3 | JKL | | | 3 | JKL |
| | | | | | 4 | MNO |
| | | | | | 5 | PQR |
| | | | | | 6 | TUV |

FIG. 3C

| Cache | 130 | | Bus 165 | Main Memory | 120 | |
|---|---|---|---|---|---|---|
| Block | Addr. | Data | | | Addr. | Data |
| 0 | 6 | TUV | | | 0 | ABC |
| 1 | 4 | MNO | | | 1 | DEF |
| 2 | 5 | GHI | | | 2 | GHI |
| 3 | 3 | JKL | | | 3 | JKL |
| | | | | | 4 | MNO |
| | | | | | 5 | PQR |
| | | | | | 6 | TUV |

FIG. 3D

| Cache | 130 | | Bus 165 | Main Memory | 120 | |
|---|---|---|---|---|---|---|
| Block | Addr. | Data | | | Addr. | Data |
| 0 | 6 | TUV | | | 0 | ABC |
| 1 | 4 | MNO | | | 1 | DEF |
| 2 | 5 | GHI | → | | 2 | GHI |
| 3 | 3 | JKL | | | 3 | JKL |
| | | | | | 4 | MNO |
| | | | | | 5 | GHI |
| | | | | | 6 | TUV |

FIG. 4A

| Block | Cache 130 Addr. | Data |
|---|---|---|
| 0 | 2 | GHI |
| 1 | 4 | MNO |
| 2 | 5 | PQR |
| 3 | 3 | JKL |

| Main Memory 120 Addr. | Data |
|---|---|
| 0 | ABC |
| 1 | DEF |
| 2 | GHI |
| 3 | JKL |
| 4 | MNO |
| 5 | PQR |
| 6 | TUV |

FIG. 4B

| Block | Cache 130 Addr. | Data |
|---|---|---|
| 0 | 2 | GHI |
| 1 | 0 | ABC |
| 2 | 6 | TUV |
| 3 | 3 | JKL |

| Main Memory 120 Addr. | Data |
|---|---|
| 0 | ABC |
| 1 | DEF |
| 2 | GHI |
| 3 | JKL |
| 4 | MNO |
| 5 | PQR |
| 6 | TUV |

FIG. 4C

| Block | Cache 130 Addr. | Data |
|---|---|---|
| 0 | 2 | GHI |
| 1 | 6 | ABC |
| 2 | 0 | TUV |
| 3 | 3 | JKL |

| Main Memory 120 Addr. | Data |
|---|---|
| 0 | ABC |
| 1 | DEF |
| 2 | GHI |
| 3 | JKL |
| 4 | MNO |
| 5 | PQR |
| 6 | TUV |

FIG. 4D

| Block | Cache 130 Addr. | Data |
|---|---|---|
| 0 | 2 | GHI |
| 1 | 6 | ABC |
| 2 | 0 | TUV |
| 3 | 3 | JKL |

| Main Memory 120 Addr. | Data |
|---|---|
| 0 | TUV |
| 1 | DEF |
| 2 | GHI |
| 3 | JKL |
| 4 | MNO |
| 5 | PQR |
| 6 | ABC |

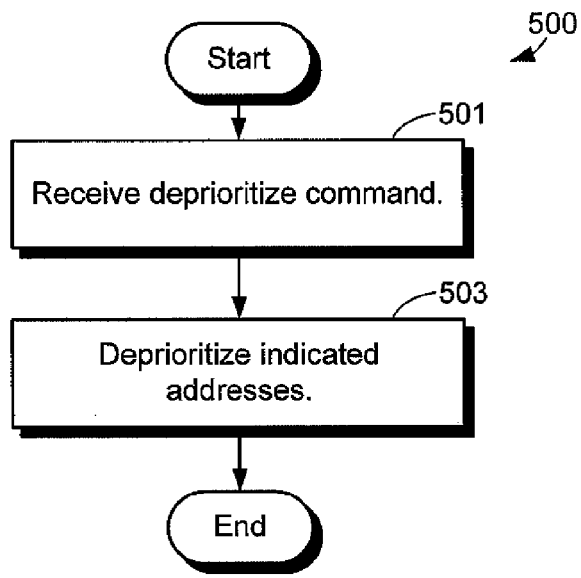

NON-BLOCKING DATA TRANSFER VIA MEMORY CACHE MANIPULATION

CROSS-REFERENCE TO RELATED APPLICATION(S)

This application is a continuation of U.S. patent application Ser. No. 12/619,571, filed Nov. 16, 2009, entitled "NON-BLOCKING DATA TRANSFER VIA MEMORY CACHE MANIPULATION," now U.S. Pat. No. 8,495,299, issued Jul. 23, 2013. The entirety of this afore-mentioned application is incorporated herein by reference.

BACKGROUND

Today's high speed processors can execute program code and process data at rates much faster than data can be retrieved from or stored in main memory. To reduce the time spent by the processor waiting to access memory, a high speed memory "cache" acts as an intermediary between the processor and main memory. A cache may have a controller and a memory component. The cache memory contains a copy of a subset of the data in the main memory. The cache controller responds to memory access operations from the processor and, depending on what data is in the cache memory, may quickly access the cache memory in order to complete the memory operation. If the cache is maintaining data necessary to respond to the memory access operation, the cache is able to respond more quickly to the operation than if the main memory needs to be accessed directly.

The cache controller, in addition to responding to memory access operations, maintains data in the cache, sometimes copying data from the main memory into the cache or writing back data from the cache into the main memory. The cache controller uses a mapping to keep track of which addresses of the main memory are "cached." For example, a cache block (a memory unit of the cache) may be associated with an address in main memory. The cache controller may maintain a mapping that identifies associations between blocks of the cache and addresses in main memory. When a processor issues a memory access operation identifying an address in main memory, the cache controller can determine, based on the mapping, whether there is a block of cache memory associated with a portion of the main memory containing that address.

Because the cache is almost always smaller than the main memory, a cache algorithm is used to select what subset of the main memory is maintained in the cache. Various cache algorithms are known, but each generally has as a goal increasing the likelihood that a memory access operation can be completed using data in the cache. In practice, however, the cache algorithm is imperfect and operations for uncached addresses are received. When an operation on an uncached address is received, the cache controller may copy data from the address of main memory into the cache. If all of the blocks of cache memory are full, the cache controller may be said to remove some addresses from the cache by writing over the data in blocks associated with those addresses with data from other addresses. The controller may then change the mapping to show the new addresses corresponding to data in that block. The cache algorithm may set a priority for determining which addresses to keep or remove from the cache when more data is to be cached than there are free blocks in the cache to hold it. When data in the cache is replaced with data at another address in the main memory in this fashion, the cache is said to evict the lower priority cached address.

The cache, processor and main memory are routinely involved in memory transfer operations. Memory access operations typically involve transmitting data between the processor, cache and main memory over one or more communication buses. Transfer operations may be initiated by the processor in the course of executing software. Common memory transfer operations include copy, move, swap, and zero.

Other techniques for improving the efficiency of memory transfer operations are also known to reduce the load on the processor Programmed input/output (PIO) is a technology by which the processor may control the read and write operations needed to complete a memory transfer. Another technology is direct memory access (DMA). DMA allows hardware other than the processor to control the memory transfer operation. In both PIO and DMA operations, data may be communicated over a bus to which the processor is connected, which may slow operation of the processor as some of its operations may also require access to the processor bus and will contend for the bus bandwidth.

SUMMARY

Computer system performance may be improved by a cache controller that can implement one or more memory operations initiated by commands from a processor. In some embodiments, these memory operations may be implemented by altering a mapping between cache blocks and blocks of main memory and/or exchanging data between the cache. Such memory operations may be implemented in a way that uses little or no bus bandwidth and processor cycles. Memory operations that may be performed by a cache controller may include move, copy, zero, deprioritize and/or invalidate.

In some embodiments and for some memory operations, the cache controller manipulates the cache mapping independently from manipulations of the cached data. For example, the cache controller may receive a command to move data from a source address to a destination address. If the data at the source address is maintained in a cache block, the mapping may be changed such that the cache block is associated with the destination address rather than the source address. The copy of the data maintained in the cache may be propagated to main memory as part of the move operation or may be propagated to main memory at a later time, such as upon eviction of the destination address or as a lazy write.

In some embodiments and for some memory operations, the cache controller executes a command without remapping a block in the cache to an address in main memory, but alters the way that data in the cache is maintained for improved efficiency. For example, an "invalidate" command may indicate to the cache controller that data stored at particular main memory addresses will not subsequently be accessed such that operations to maintain coherency between a cached copy of that data and the copy of the data in main memory need not be performed. An "invalidate" command may also indicate that any blocks of cache memory allocated to maintaining a copy of that data can be used for other data.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIGS. 3A-3D illustrate a sequence of states of a cache, bus and main memory during processing of an exemplary copy command;

FIGS. 4A-4D illustrate a sequence of states of a cache, bus and main memory during processing of an exemplary swap command;

FIG. 5A is a flow chart of a method for processing a deprioritize command in a computer system;

FIGS. 5B and 5C illustrate a sequence of states of a cache during processing of an exemplary deprioritize command;

DETAILED DESCRIPTION

Figure 1A:
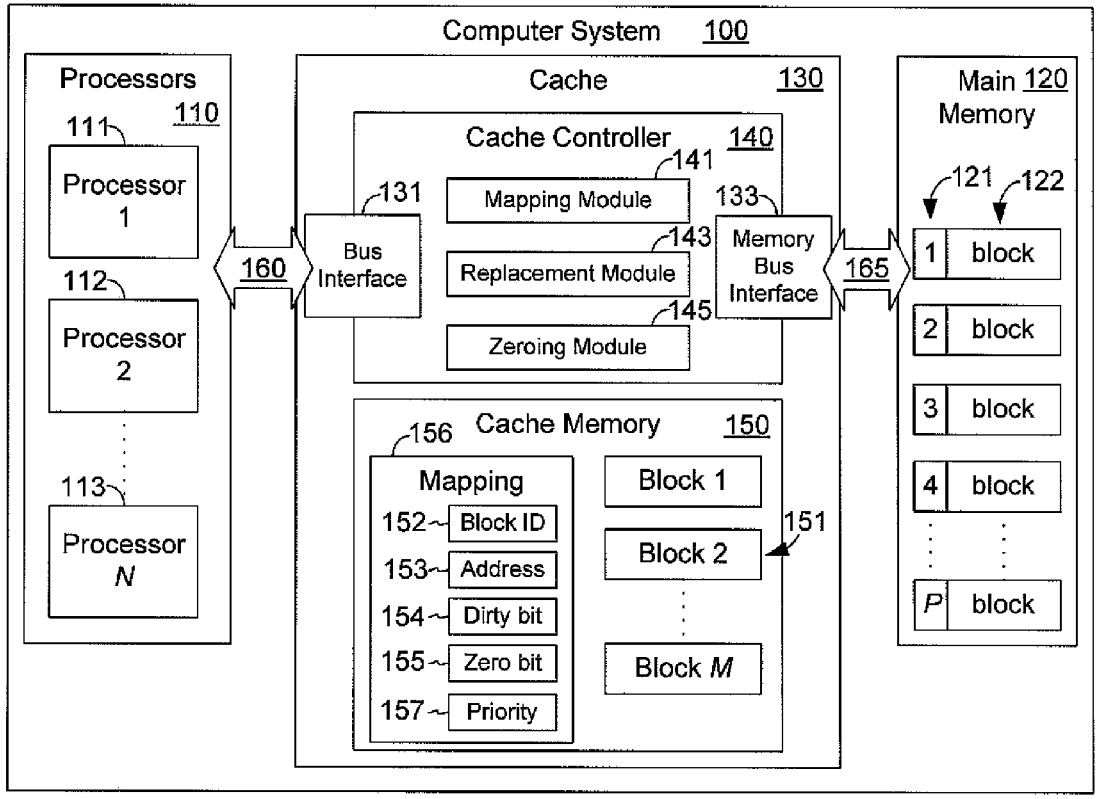
FIG. 1A is a block diagram of a computer system according to some embodiments of the invention.

The inventors have recognized and appreciated that drawbacks of available mechanisms for performing memory transfer operations may be avoided with an improved cache controller and methods of operation of a cache. Conventional architectures using programmed input/output (PIO), in addition to placing a load on the processor, typically consume bus bandwidth on a bus to which a processor may be connected. Consuming processor bus bandwidth limits the availability of the processor bus to transfer data for other operations the processor is to perform, causing delay and reducing performance in ways that may be avoided in accordance with the components and techniques described herein.

Direct memory access (DMA) also has several limitations and disadvantages that may be avoided. DMA transfers may also consume bus bandwidth. Additionally, when data spanning a range of addresses is transferred, data at those addresses may be in an inconsistent state until the entire transfer is complete, requiring wait time for the entire transfer. Accordingly, performance may be improved by reducing the need for DMA operations.

The inventors have recognized and appreciated that appropriate manipulation of a cache mapping may reduce the number of conventional memory operations, such as DMA transfers, that are performed in a computer system. A corresponding decrease in time, processor load and/or processor bus bandwidth utilization may be achieved. In some aspects, manipulation of the cache mapping may involve remapping a cache block associated with a first range of addresses in main memory to be associated with a second range of addresses in main memory. Remapping may reduce, eliminate, or delay use of bus bandwidth. Such manipulations may be managed by a cache controller in a way that is transparent to the processor such that the use of processor cycles is also reduced or eliminated.

Accordingly, a cache controller may be provided with an interface through which it may receive commands from a processor. These commands may be generated by programs executing on the processor and may signal higher level memory operations are to be performed, including memory operations of the type that might otherwise have been performed as a DMA operation. The cache controller may be adapted to execute these commands by manipulating a cache mapping. Such commands may be "non-blocking" in the sense that execution of the command does not directly block execution of further instructions by the processor on which the operation is being performed. These operations also need not indirectly block further operations by the processor because they need not consume bandwidth on a processor bus while they are performed.

Examples of commands that may be implemented in this fashion include moving or copying a block of data from one block in main memory to another block of main memory. Another example of such a command is a "zeroing" command.

The inventors have further recognized and appreciated that a cache controller provided to receive commands to perform remapping operations additionally, or alternatively, may receive commands that alter operation of the cache controller in ways that also achieve more efficient operation of a computer system. Caching algorithms for prioritizing cached data may be enhanced by the ability for software components executing on a processor to indicate that certain address ranges in main memory are no longer being processed or are unlikely to be accessed. The cache controller may be configured with an interface to receive commands from a processor, such as a command to invalidate or deprioritize one or more addresses.

FIG. 1A shows an exemplary block diagram of a computer system 100 in which improved memory management techniques may be employed. Computer system 100 includes a set of processors 110, a main memory 120, and a cache 130. Processors 110 and cache 130 may be communicatively coupled by a processor bus 160. A memory bus 165 may communicatively couple cache 130 and main memory 120. Memory bus 165 is illustrated as separate from processor bus 160, indicating that data may be communicated on memory bus 165 without consuming bandwidth on processor bus 160. Though, processors 110, main memory 120 and cache 130 may be communicatively coupled in any suitable way.

Processors 110 may include any suitable number of processors. For example, processors 110 may include one or two or more processors. Here N processors are shown; namely processors 111, 112, ... and 113. Processors 110 may include any processor known in the art or any suitable processing device. For example and not limitation, processors 110 may include any of a central processing unit (CPU), digital signal processor (DSP), controller, addressable controller, general or special purpose microprocessor, microcontroller, addressable microprocessor, programmable processor, programmable controller, dedicated processor, dedicated controller, or any other suitable processing device.

Main memory 120 may store data on which one or more memory operations are to be performed based on programs executing on the processors 110. Main memory 120 may be a computer-readable storage medium as is known in the art or any suitable type of computer-readable storage medium. For example and not limitation, main memory 120 may be any suitable type of random-access memory (RAM).

The use or significance of the data in memory 120 is not critical to the invention and memory operations as described herein may be performed on data in main memory 120 regardless of its meaning or use. For example the data in main memory 120 may constitute software modules containing computer-executable instructions that when executed by a processor perform a desired function. Though, the data in main memory 120 may alternatively or additionally represent parameters or other information accessed when computer-executable instructions are executed. In this case, computer system 100 may contain additional memory, including other memory for storing computer-executable instructions.

Main memory 120 has memory blocks 122 for storing data that are indexed by memory addresses 121. Each memory block may store multiple bits of information. The number of bits of information stored by a memory block is not critical to the invention. A block could be a group of bits termed a word or a page. Though, a block may be of any suitable size and may be identified in any suitable way. For example, a block may be identified by a starting address and a block size or by a starting address and an ending address. In some embodiments, a computer system may operate on memory blocks of predetermined sizes. In this case, when an operation is to be performed on a block of memory, a single address may be adequate to identify the block. Further, it should be appreciated that a block of main memory need not correspond in any way to the structure of the components used to implement main memory 120.

In the example shown, main memory has P addresses 121, identifying P blocks 122 on which operations, as described herein, may be performed. P may be any suitable value. In some embodiments, the total amount of data that may be stored on main memory 120 may be between ten and one hundred times the amount that can be maintained in cache 130. Though, any suitable size cache and main memory may be used.

Cache 130 acts as an intermediary between processors 110 and main memory 120. Instructions that access memory locations issued by processors 110 may be implemented using data maintained in cache 130 or may alter data maintained in cache 130. Accordingly, cache 130 may perform one or more data caching functions as are known in the art. Additionally, cache 130 may include a controller that responds to additional commands, as described in greater detail below.

Here cache 130 is illustrated as a shared cache accessible to processors 110 over processor bus 160. Though, cache 130 may be a cache for a specific processor. While computer system 100 is illustrated as having one cache, some embodiments may have multiple caches. For example, each of processors 110 may also include a dedicated processor cache. Some embodiments with multiple caches are discussed below with reference to computer system 101 shown in FIG. 1B.

Cache 130 includes a cache controller 140 and a cache memory 150. The implementation of these components is not critical to the invention. For example, cache controller 140 and cache memory 150 may be integrated on the same integrated circuit (IC) or on separate ICs connected through a suitable communications medium.

Cache controller 140 manages cache 130, including cache memory 150. Cache controller 140 may be a form of processor that executes computer-executable instructions for managing cache 130. These commands may be burned as microcode in the cache controller 140 or stored in any other suitable location or format. Execution of instructions by cache controller 140 may be responsive to commands received over bus 160 or bus 165. For example, cache controller 140 may respond to memory transfer commands issued from processors 110, which are received over processor bus 160.

The computer-executable instructions that are executed by cache controller 140 may include one or more software modules for performing functions in response to received commands. The modules may include a mapping module 141, a replacement module 143, and a zeroing module 145. Mapping module 141 may be configured to control the mapping of cache blocks 151 of cache memory 150 to addresses 121 of main memory 120. A replacement module 143 may implement a cache algorithm for determining the replacement priorities of cached addresses. A zeroing module 145 may be used to set the data at one or more addresses to a default value. The modules may additionally or alternatively include any suitable modules for performing methods of managing cache 130. In some embodiments, the modules may be implemented as microcode.

Cache memory 150 includes a suitable number of cache blocks 151 for storing data. Cache controller 140 may manage the data stored in these blocks such that cache blocks 151 may each contain a cached version of data from some portion of main memory. In the example illustrated, cache memory 150 includes M cache blocks 151. M may be any suitable value.

Cache 130 may also include a mapping 156 for maintaining an association between data in the cache and locations in main memory 120. For simplicity of illustration, each block in the cache is treated as containing the same amount of data as in a block of main memory. In this embodiment, an association is indicated by identifying a block in main memory associated with a cache block. However, it should be recognized that a one-to-one relationship between cache blocks and main memory blocks is not required and any suitable mechanism may be used to form associations between data in the cache and data in main memory.

Mapping 156 may be managed by cache controller 140. In the illustrated example, mapping 156 is shown as part of cache memory 150. Though, it is not critical where the information constituting mapping 156 is stored. This information may, for example, be stored in a centralized data structure within cache 130 or may be distributed across multiple data structures stored in one or more memory devices in any suitable way.

For each cache block in cache memory 150, mapping 156 may contain a block ID 152, a mapped address 153, a dirty bit 154, a zero bit 155, and an eviction priority 157. Block ID 152 identifies the block in the cache to which the other parameters correspond. Block ID 152 may be stored in writable memory, read-only memory, or may be inferred from the hardware design of cache memory 150.

Mapped address 153 associates the cache block with a memory block in main memory 120. Mapped address 153 may identify the corresponding block in main memory 120 by its address or in any other suitable way. For simplicity of illustration, the amount of data each cache block may store is assumed to equal the size stored by each memory block. Those of skill in the art will appreciate that known mapping techniques may be used when cache blocks differ in size from the memory blocks in main memory 120.

Mapping 156 may also includes a consistency mark or "dirty bit" 154 for each cache block. Dirty bit 154 indicates whether the data stored in the cache block is consistent ("not dirty") or inconsistent ("dirty") with the data in the corresponding block in main memory 120. Dirty bit 154 may be set to indicate "dirty" data when data in the cache is modified, other than by copying from the corresponding memory block in main memory 120 and may be cleared when the data in the cache is written into the corresponding memory block in main memory 120. Collectively the dirty bits for all cache blocks 151 in mapping 156 may be referred to as consistency memory.

Mapping 156 may also include a zeroing mark or "Zero bit" 155 for each cache block. Zero bit 155 may be set when the corresponding block in main memory 120 is to be set to a default value, such as zero. Collectively the zeroing marks for all cache blocks 151 in mapping 156 may be referred to as zeroing memory.

Mapping 156 may also include an eviction priority 157 for each cache block. Eviction priority 157 may specify a priority for evicting data from the cache block when an uncached block from main memory 120 is to be cached. A low priority indicates that the data stored by the cache block is more likely to be evicted by memory controller 140 and replaced with data stored in a block of main memory indexed by a different address. In some embodiments, eviction priority 157 is only explicitly indicated for those cache blocks caching data at an address to be evicted.

Computer system 100 may also include any other suitable computer components not shown in FIG. 1A. For example and not limitation, computer system 100 may include, peripherals, other processors and memories, input/output devices such as a display, keyboard, and mouse, and any other type of suitable computer component.

Figure 1B:
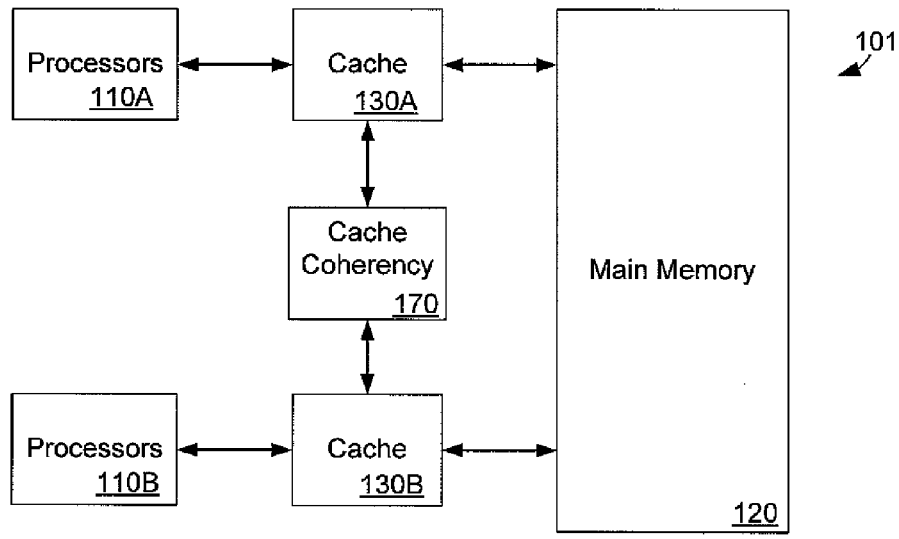
FIG. 1B is a block diagram of a computer system according to some embodiments of the invention.

FIG. 1B shows an exemplary block diagram of a computer system 101, illustrating that the techniques described herein may be applied to computer systems regardless of architecture. In this example, processors 110A access main memory 120 through cache 130A and processors 110B access main memory 120 through cache 130B. A cache coherency component 170 maintains consistency between caches 130A and 130B. For example, when a write operation is made by processors 110A, cache coherency component 170 communicates the operation to cache 130B. Cache 130B may then update any cached copy of the data at the write address to maintain data consistency. In some embodiments, processors 110A is a single processor into which cache 130A is integrated.

Figure 1C:
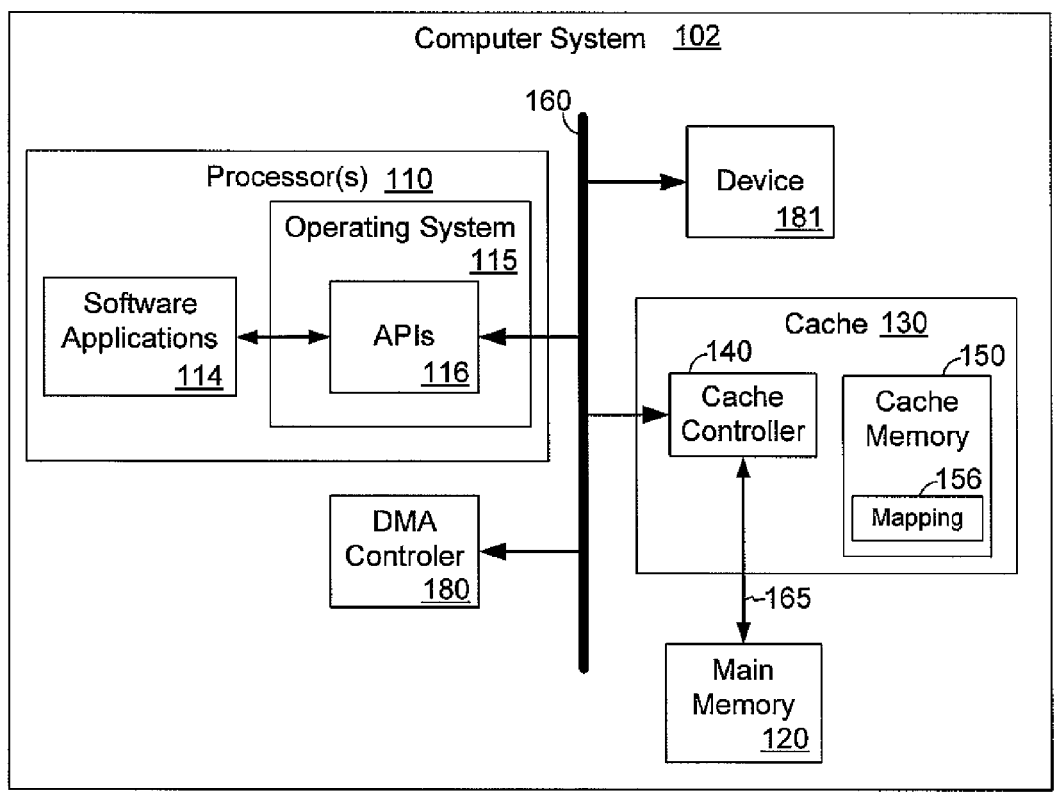
FIG. 1C is a block diagram of a computer system according to some embodiments of the invention.

FIG. 1C is an exemplary block diagram of a computer system 102 illustrating that the techniques described herein may be applied to computer systems of regardless of architecture. Computer system 102 includes processors 110, cache 130 and main memory 120. Processors 110 and cache 130 are communicatively coupled by processor bus 160. Though, bus 160 may be shared by other devices in computer system 102 such as DMA controller 180 and device 181. Memory bus 165 communicatively couples cache 130 and main memory 120.

Processors 110 may execute software applications 114 and operating system (OS) 115. OS 115 may manage the activities and sharing of resources of computer system 102. OS 115 may provide various functions and manage computer system 102 through various components. These components may include, for example and not limitation, dynamically linked libraries (e.g., a dynamic-link library), programming interfaces, component object models (COMs), globally unique identifiers, registry keys, or any uniquely identifiable part of OS 115.

OS 115 may provide functions for software applications 114 executing on computer system 102, for example, through function calls from applications 114. In some embodiments, OS 115 includes programming interfaces 116. Programming interfaces 116 may allow software applications 114 to request memory transfer and cache management operations. In some embodiments, memory operations as described herein may be implemented as part of the operating system, though implementation within an operating system is not a requirement of the invention.

In some embodiments, software applications 114 are assigned virtual address spaces. The virtual address spaces may be mapped by OS 115 to physical addresses of main memory 120. Programming interfaces 116 may be configured to receive commands from software applications 114 specifying manipulations to memory in terms of virtual addresses and translate the virtual addresses into physical addresses of main memory 120. Though, the point within the system at which logical to physical address translation occurs is not a limitation of the invention. In some embodiments, for example, cache controller 140 may manage virtual to physical address conversion. In some embodiments, programming interfaces 116 are application programming interfaces (APIs).

Cache controller 130 receives and performs commands from programming interfaces 116 sent on behalf of software applications 114. Cache controller 140 uses mapping 156 to determine if and where the data at the physical addresses are stored in blocks of cache memory 150. For example, cache controller 140 may search the mapped addresses in mapping 156 for a physical address. If the physical address is found in mapping 156, cache controller 140 may determine that the data at the physical address is cached by the corresponding cache block.

Having described exemplary computer systems, operation of a computer system according to some embodiments is described with reference to the following methods and examples. Herein memory addresses are taken to be physical addresses. Those of skill in the art will appreciate that where virtual addresses are specified, conversion to physical addresses may be performed, for example, in ways known in the art.

Figure 2B:
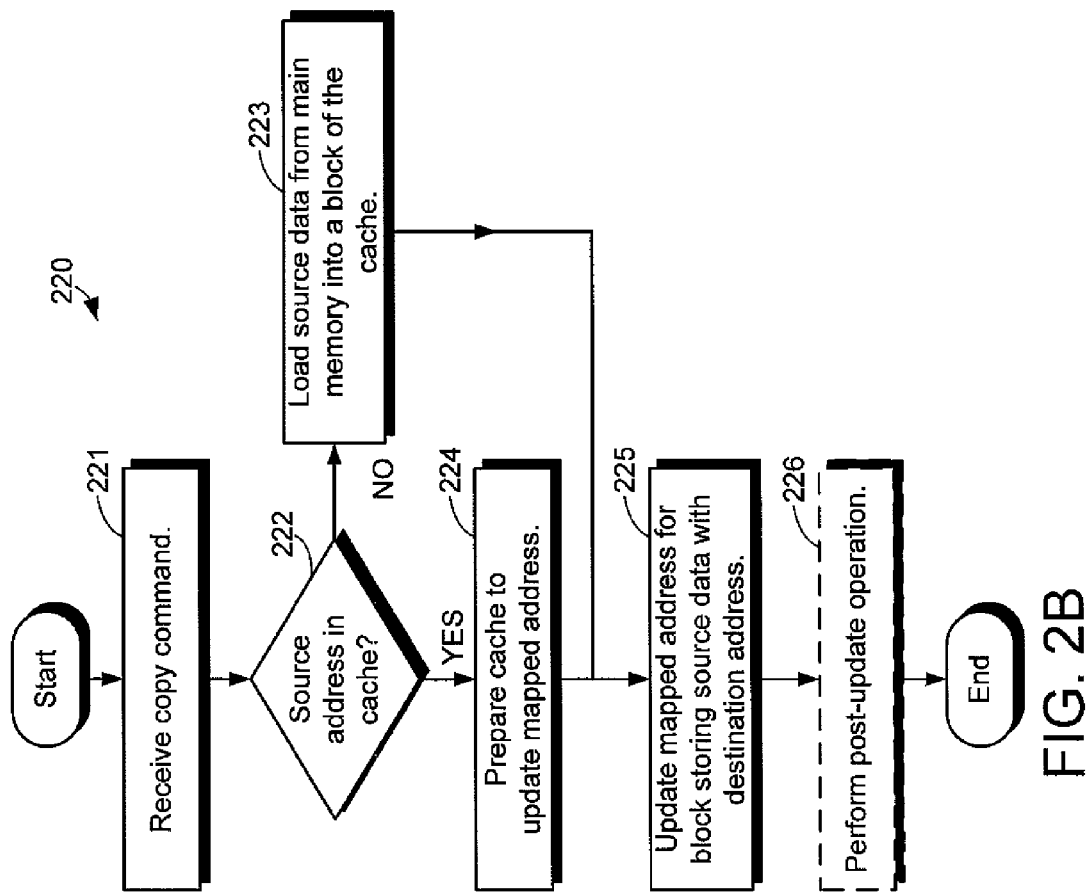
FIG. 2B is a flow chart of a method for processing a copy command in a computer system.
Figure 2A:
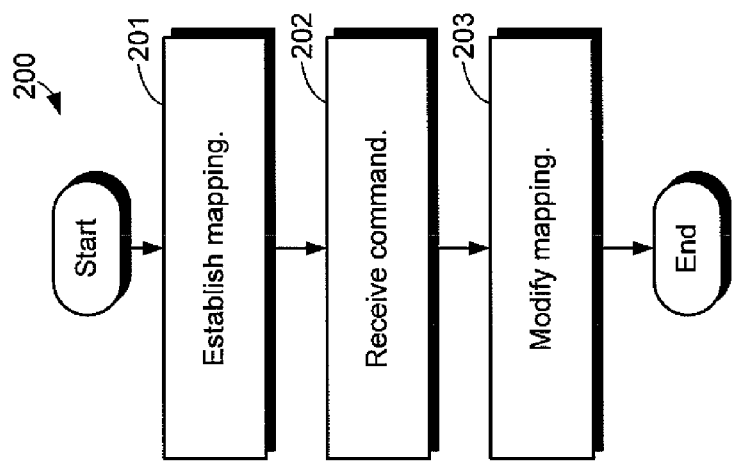
FIG. 2A is a flow chart of a method for managing memory in a computer system.

FIG. 2A is a flow chart of a method for managing memory in a computer system. Method 200 may be performed, for example, by operation of cache controller 140 of computer system 100 shown in FIG. 1A. Though, method 200 may be implemented in any suitable way.

At step 201, the cache controller establishes a mapping from blocks of memory in a cache of the computer system and memory addresses in a main memory of the computer system. In some embodiments, the mapping is established by storing a mapped address with each cache block that identifies an address in the memory corresponding to the block. The mapped address may identify the address in main memory in any suitable way. For example, in a fully associative cache, where each address of the main memory may be mapped to any block in the cache, the cache may store the full address as the mapped address. In a direct mapped cache, where each address may only be mapped to exactly one block in the cache, the map may only store enough bits to distinguish among those addresses mapped to the specific block in the cache. For example, the least significant bits of the address may be dropped when these bits are common to all addresses that may be written to the cache block. A similar technique may be used to map cache blocks to addresses in an X-way set associative cache, where each address of main memory may be mapped to X cache blocks, where X is any positive integer. The discussion herein is applicable to a fully associative cache, though, those of skill in the art will appreciate that embodiments may be implemented with any suitable type of cache.

Establishing a mapping at step 201 may include establishing any of a dirty bit, a zero bit, and an eviction priority for each cache block. In some embodiments, a mapping is established which maintains for each cache block a mapped address, a dirty bit, a zero bit, and an eviction priority. Though, the established mapping may have any suitable entries. In some embodiments, the mapping may be established as a result of a cache controller responding to memory access operations over a period of time using techniques as are known in the art.

At step 202, a command is received by the cache controller indicating a modification of the mapping. Such a command, for example, may be generated by an operating system in response to an application program expressly calling a function or by the operating system detecting through one or more actions taken by one or more applications that cache controller may efficiently perform an operation. The received command may be any suitable type of command. For example and not limitation, the received command may be a memory transfer operation command, such a copy, move, swap command or zeroing command. As another example, the received command may be an operational hint that allows the cache controller to manage its mapping more efficiently, such as a deprioritize or invalidate command. Though, any suitable type of command may be received. In some embodiments, the command is received from a processor of the computer system. For example, the command may be received as a result of software executing on the processor.

At step 203, in response to the command, the cache controller modifies the cache mapping. For example, in an embodiment where the established mapping includes mapped addresses, a cache block initially mapped to a first address in the main memory may be updated at step 203 to be mapped to a second address in the main memory without changing the data stored in the cache block. As another example, in an embodiment where the established mapping includes eviction priorities, a cache block's eviction priority may be modified to deprioritize the cached data. After step 203, method 200 ends.

FIG. 2B is a flow chart of a method 220 for managing memory in a computer system when a copy command is received. A copy command instructs copying of data from a block at a source address to a block at a destination address. In some embodiments, method 220 is a specific embodiment of steps 202 and 203 of method 200. Method 220 may be performed in a computer system by operating a cache controller such as, for example, cache controller 140 of computer system 100 shown in FIG. 1A.

At step 221, a copy command is received by the cache controller. The copy command may specify the source of data for the copy in any suitable way, such as by specifying a source address, a set of source addresses, or a range of source addresses at which data to copy is stored. A destination for the copy may also be specified in any suitable way, such as a destination address, set of destination addresses or a range of destination addresses may specify the destination of the data.

Steps 222 through 225 are performed for each source and destination address pair. These steps may be performed simultaneously, sequentially or in any suitable way for each address pair.

At step 222, the cache controller determines whether the data at the source address is currently mapped to a block of the cache. The cache controller may make the determination, for example, by checking whether any block in the cache has a mapped address corresponding to the source address.

If the determination at step 222 is no, method 220 proceeds to step 223 where the data at the source address is loaded from the main memory into a block of the cache. In loading the source data into the cache block, the mapped address for the block may be set to identify the source address. Any suitable cache algorithm may be used to identify to which block in the cache the source data should be written. Though, in some embodiments, if a block is already mapped to the destination address, that block may be selected for replacement. If selected, that block may be invalidated. When a block in the cache is invalidated rather than evicted, data in the cached block is not written back to main memory, even if "dirty." Invalidating an address is subsequently discussed with reference to FIGS. 6A-6D.

If the determination at step 222 is yes, method 220 proceeds to step 224. At step 224, method 220 prepares the cache to update the mapped address. When the cache block caching data at the source address is dirty, the method writes back the dirty data from the cache block to the block in main memory at the source address. If the data is not dirty, write-back is not performed at step 224.

The method may also check whether the destination address is mapped to a block of the cache. If so, the mapping may be updated to indicate that the block is no longer associated with the destination address. Clearing the mapping in this fashion prevents two separate cache blocks from being mapped to the same destination address. The destination block may be cleared from the mapping whether or not source data is loaded at block 223.

Method 220 proceeds from steps 223 and 224 to step 225. At step 225, the method changes the mapping such that the block initially mapped to the source address is mapped to the destination address. After updating the mapped address, normal operation of the cache will result in memory access instructions directed at locations associated with the destination address being performed on the copied data in the cache.

At step 226, additional update steps may optionally be performed. Upon completion of the step 225, the cache may contain a block containing data for the destination address in main memory. However the data in main memory may not match that in the cache. Conversely, the correct data may be stored in main memory associated with the source addresses, but that data may not be cached. Accordingly, post-update operations may write data from the cache to the destination address or copy into the cache data from the source address in main memory.

These steps may be performed at any suitable time and may be performed under direction of the cache controller using memory bus 165 (FIG. 1). Accordingly, completion of these steps need not block the processor, either by requiring processor operations or processor bus bandwidth.

In some embodiments, the data may be written to the destination address of the main memory from the cache block as part of the copy operation. However, in some embodiments, the write-back may be deferred until a write-back would otherwise occur as part of cache operation. In such a scenario, a dirty bit may be set for the cache block associated with the destination address to indicate the data is dirty. In such an embodiment, a write-back to main memory may be performed, for example, upon eviction of the destination block from the cache or as a lazy write. Lazy writes are asynchronous writes from the cache to the main memory. In some embodiments, lazy writes are performed while the cache and/or memory bus is otherwise idle. Thus, lazy writes may be performed several seconds after the copy command is functionally complete. In another embodiment, a dirty bit is not kept, and write-back is always performed at eviction.

Likewise, if it is desired to reload the source data in the cache, data from the source address may be loaded into the cache at any suitable time. The reload may occur under the control of the cache controller using the memory bus, such that the processor need not be blocked. Though, data from the source destination may not be reloaded into the cache until that data is accessed again.

Those of skill in the art will appreciate that a variation of method 220 may be used for processing a move command. A move command, in as much as it is differs from a copy, implies that the data at the source addresses is no longer valid. Accordingly, post-update operations at step 226 need not entail reloading source data into the cache. To the contrary, to the extent data was retained in the cache, post-update operations at step 226 may entail invalidating the cache block holding that data. In some embodiments, memory management software executing on the processor issuing the move command, or otherwise within the computer system 100, may ensure that the data at the source address is not subsequently accessed.

Figure 2C:
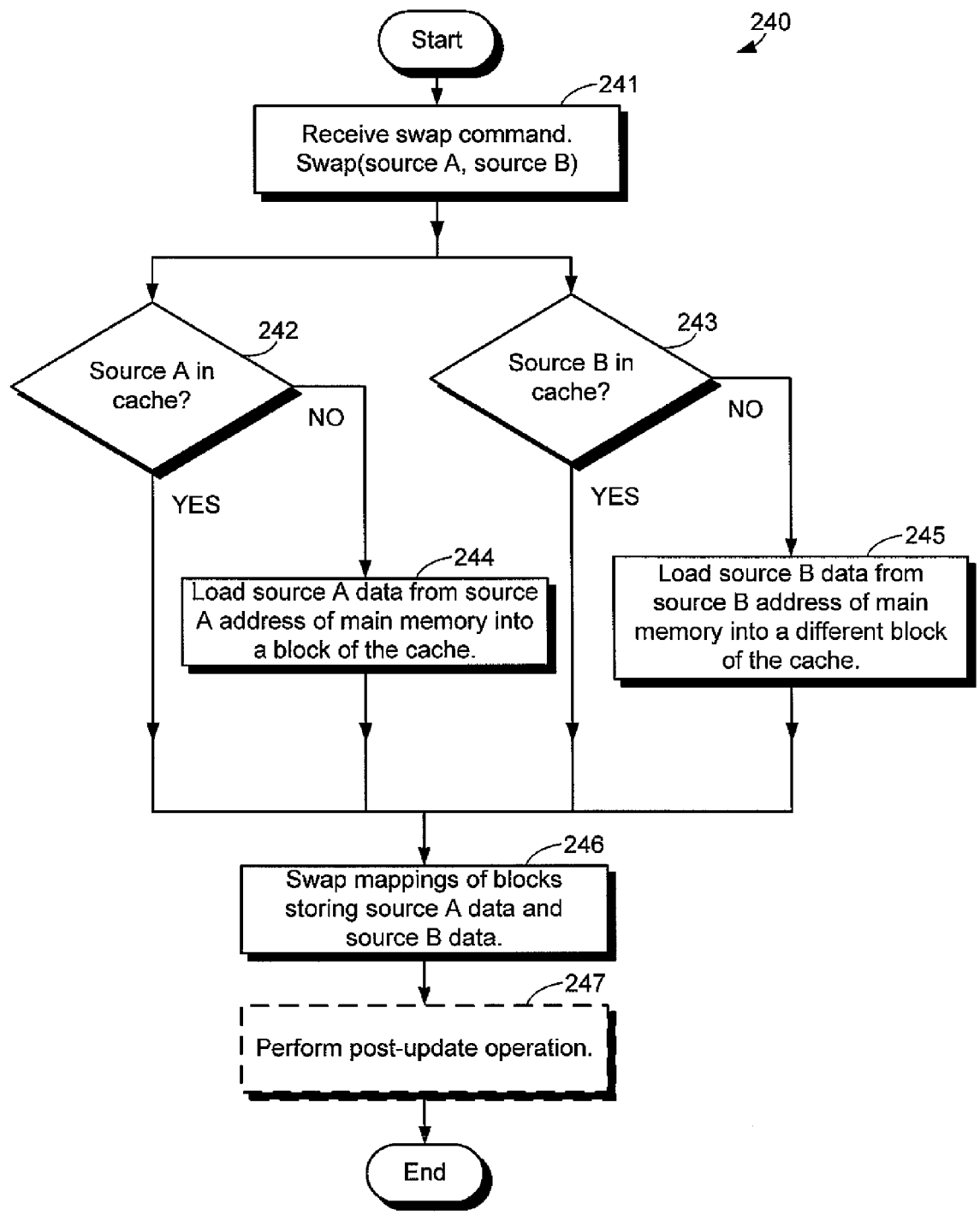
FIG. 2C is a flow chart of a method for processing a swap command in a computer system.

Another non-blocking operation that may be supported in some systems is a swap command. FIG. 2C is a flow chart of a method 240 for managing memory in a computer system when a swap command is received. As the name suggests, in processing a swap command data stored at a first address is swapped with data stored at a second address. In some embodiments, method 240 is a specific embodiment of steps 202 and 203 of method 200. Method 240 may be performed in a computer system by operating a cache controller such as, for example, cache controller 140 of computer system 100 shown in FIG. 1A.

At step 241, a swap command is received by the cache controller. The swap command specifies an address, set of addresses or a range of addresses as a first source, "source A", at which first data to swap is stored. Similarly, a second source, "source B", at which second data to be swapped is stored, may be specified by an address, set of addresses or a range of addresses. Though, source A and source B addresses may be specified in any suitable way. When more than one source A and source B address are specified by the command, the address pairs to be swapped may be determined in any suitable way.

Steps 242 through 247 are performed for each pair of source addresses to be swapped. These steps may be performed simultaneously, sequentially or in any suitable way for each address pair.

At step 242, the cache controller determines whether the source A address is currently mapped by the cache. The cache controller may make the determination, for example, by checking whether any block in the cache has a mapped address corresponding to the source A address. A similar determination is made at step 243 for the source B address.

If the determination at step 242 is no, method 240 continues to step 244. At step 244, the data at the source A address is loaded from the main memory into a block of the cache. In loading the data at the source A address into the cache block, the mapped address for the cache block is set to identify the source A address.

Similarly, if the determination at step 243 is no, method 240 continues to step 245 the data at the source B address is loaded from the main memory into a block of the cache. In loading the data at the source B address into the cache block, the mapped address for the cache block is set to identify the source B address.

Once data from both source A and source B are confirmed to be in the cache, method 240 continues to step 246 where the cache mapping is changed such that the mapped addresses for the respective cache blocks are swapped. Specifically, the mapped address for the cache block storing the data at the source A address is changed from the source A address to the source B address. Similarly, the mapped address for the block storing the data at the source B address is changed from the source B address to the source A address. The swap of mapped address may be performed simultaneously or as part of an atomic operation so as to prevent the possibility that a single address, (e.g., either the source A or source B address) may be ambiguously mapped by two cache blocks.

At step 247, additional update steps may optionally be performed. As described above in connection with step 226 (FIG. 2B), post-update operations may involve write-back of data from the cache to main memory. Here the blocks associated with source A and source B may be written back. Though, none, one or two of these blocks may be written back as part of the swap operation. Some or all of these write-back operations may be deferred until eviction or other suitable time. Accordingly, processing at step 247 may simply entail setting a dirty bit for one or both blocks. Though, in some embodiments, not express steps may be taken to control write back, if write-back would otherwise occur as part of normal operation of the cache.

Having described methods 220 and 240 for processing a copy and swap command, respectively, an example of manipulation of the mappings associated with each operation each is given with reference to FIGS. 3A-3D and FIGS. 4A-4D.

FIGS. 3A-3D show a sequence of states of cache 130, memory bus 165 and main memory 120 during an exemplary copy operation. In each figure, the cache memory is represented by a three column table. It should be appreciated that the mapping is illustrated conceptually and that the information illustrated may be stored with any suitable organization.

In this example, columns 301 and 302 represent entries in a portion of the cache mapping. Specifically, column 301 of the mapping identifies the cache block and column 302 identifies an address of main memory 120 to which the respective block is mapped. Column 303 illustrates the data stored in each cache block corresponding to the identified cache block. The cache mapping may also store additional information not shown (e.g., a dirty bit).

Main memory 120 is also represented by a columned table. Column 304 identifies an address of in the main memory and column 305 provides the data stored in the memory block corresponding to the address.

FIG. 3A illustrates an initial state of cache 130, memory bus 165 and main memory 120. In this example, block 0 of cache 130 is mapped to address 6 of main memory 120 and stores data "TUV"; block 1 is mapped to address 4 of main memory 120 and stores data "MNO"; block 2 is mapped to address 5 of main memory 120 and stores data "PQR"; and block 3 is mapped to address 3 of main memory 120 and stores data "JKL". In the illustrated example, the cache blocks are not dirty.

In this example, a copy command is received by the cache controller, instructing copying of data from address 2 to address 5 (see step 221, FIG. 2B). In this example, the source address, address 2, is not stored in cache 130 (see step 222).

As shown in FIG. 3B, address 5 is evicted from the cache to make room for the data copied from the source address. The address to be evicted may be chosen in any suitable way. For example, a cache algorithm may be used to prioritize cache blocks and designate blocks for eviction. In this example, address 5 is selected for eviction from block 2. Since block 2 is not dirty, no write-back to main memory 120 is performed. The source data is copied into block 2 of cache 130 (see step 223) over bus 165. The mapped address for block 2 is set to address 2, though this step may not be performed in all embodiments.

FIG. 3C illustrates updating the cache mapping. Specifically, block 2 is remapped from address 2 to address 5 (see step 225).

Upon updating the map, optional steps may also be performed such as those described in step 226. FIG. 3D illustrates an optional step of writing the data from block 2 to the memory address in main memory 120 to which the block is mapped, namely address 5. Write-back may be done, for example, at the time of eviction or as part of a lazy write.

FIGS. 4A-4D show a sequence of states of cache 130, memory bus 165 and main memory 120 during an exemplary swap operation. The states of the cache memory and main memory 120 are represented as tables in a similar way as in FIGS. 3A-3D.

FIG. 4A illustrates an initial state of cache 130, memory bus 165 and main memory 120. In this example, block 0 of cache 130 is mapped to address 2 of main memory 120 and stores data "GHI"; block 1 is mapped to address 4 of main memory 120 and stores data "MNO"; block 2 is mapped to address 5 of main memory 120 and stores data "PQR"; and block 3 is mapped to address 3 of main memory 120 and stores data "JKL". In the illustrated example, the cache blocks are not dirty.

In this example, a swap command is received by the cache controller instructing swapping of data at address 0 with data at address 6 (see step 241, FIG. 2C). As shown in FIG. 4A, initially neither source address is stored in cache 130.

As shown in FIG. 4B, once it is determined that source address 0 is not mapped by cache 130 (see step 242), the data at address 0 is copied from main memory 120 into cache 130 (see step 244). Similarly, once it is determined that source address 6 is not mapped by cache 130 (see step 243), the data at address 6 is copied from main memory 120 into cache 130 (see step 245). The blocks of cache 130 to which the data at the source addresses is copied may be chosen in any suitable way. For example, a cache algorithm may have identified blocks 1 and 2 as having the lowest priority in the cache. FIG. 4B illustrates that data is moved from main memory to the cache over memory bus 165.

FIG. 4C illustrates updating the cache mapping (see step 246). Specifically, block 1 is remapped from address 0 to address 6. Similarly, block 2 is remapped from address 6 to address 0.

Upon updating the mapping, optional steps may also be performed such as those described in step 247 of method 240. FIG. 4D illustrates an optional step of writing the data from cache 130 back to main memory 120. Specifically, data in cache block 1 is copied to a block in main memory 120 having address 6 and block 2 is copied to a block in main memory 120 having address 0 in accordance with the remapping.

In addition to copy and swap commands, the cache controller may be configured to receive a "deprioritize" command. A deprioritize command indicates one or more addresses which are candidates for eviction. For example, when a new address is to be cached, the cache algorithm may select deprioritized addresses for eviction to make room in the cache. Deprioritizing may be used by software applications when processing is completed and access to data at a particular address or set of addresses is no longer expected. Some standard cache algorithms heuristics might otherwise consider these addresses as having high priority since they represent the most recently used addresses. A deprioritize command allows hardware to more intelligently use cache space.

FIG. 5A is a flow chart of a method 500 performed by cache controller for processing a deprioritize command. Method 500 may be performed in a computer system by operating a cache controller such as, for example, cache controller 140 of computer system 100 shown in FIG. 1A.

At step 501, a deprioritize command is received. The deprioritize command may specify an address, set of addresses or a range of addresses as addresses to be deprioritized. Though, addresses to be deprioritized may be specified in any suitable way.

At step 503, the addresses indicated by the deprioritize command are deprioritized. The deprioritized addresses may be deprioritized in any suitable way. In some embodiments, an eviction priority associated with cache blocks mapped to the deprioritized addresses is updated to reflect the address's deprioritized status. A cache algorithm may manage how the addresses are deprioritized. For example, in some embodiments, the cache blocks mapped to deprioritized addresses are evicted before other blocks in the cache. The order in which deprioritized addresses are evicted may be selected in any suitable way. In some embodiments, blocks mapped to deprioritized addresses and that are not dirty are evicted before dirty blocks mapped to deprioritized addresses. After step 503, method 500 ends.

FIGS. 5B and 5C illustrate a mapping within cache 130 before and after processing a deprioritize command according to method 500. As shown in FIG. 5B, in this example, mapping 156 is represented by a four column table. The eviction priority is given in column 510, the cache block is identified in column 511, the mapped address is shown in column 512, and whether the block is dirty is shown in column 513. In this example a cache algorithm ranks each block with a priority number. The address mapped by the block having the lowest priority number is the first address to be evicted. It should be appreciated, however, that the priorities may be specified in any suitable way. For example, priority may simply be binary (e.g., prioritized, deprioritized).

As shown in FIG. 5B, in this example, block 0 initially has priority "1" and contains not dirty data mapped to address 5; block 1 has priority "2" and contains dirty data mapped to address 3; block 2 has priority "0" and contains dirty data mapped to address 4; and block 3 has priority "3" and contains not dirty data mapped to address 2.

Assume a deprioritize command specifying deprioritization of address in the range 0 to 3 is received by the cache controller (see step 501, FIG. 5A). Recall that which addresses are cached is generally transparent to software executing on the processors of the computer system. It is seen from column 512 that in the address range 0-3, only addresses 2 and 3 are actually cached in this example.

FIG. 5C illustrates cache 130 after processing the deprioritize command by a cache algorithm. Blocks 1 and 3, which cache address 2 and 3, respectively, have been moved to the lowest priority. In this example, block 1, which is dirty, is given higher priority over block 3, which is not dirty. Evicting not dirty addresses first may further postpone write back to the cache. In this example, the cache algorithm maintains the relative priority of the non-deprioritized addresses. Specifically, block 0 has a higher priority than block 2.

Another command the cache controller may receive is an invalidate command. An invalidate command indicates that the data at addresses specified by the command is obsolete and can be evicted without write back. Software applications may use the invalidate command to avoid consuming bus bandwidth and cache space for short lived data.

Figures 6A, 6B, 6C, 6D:
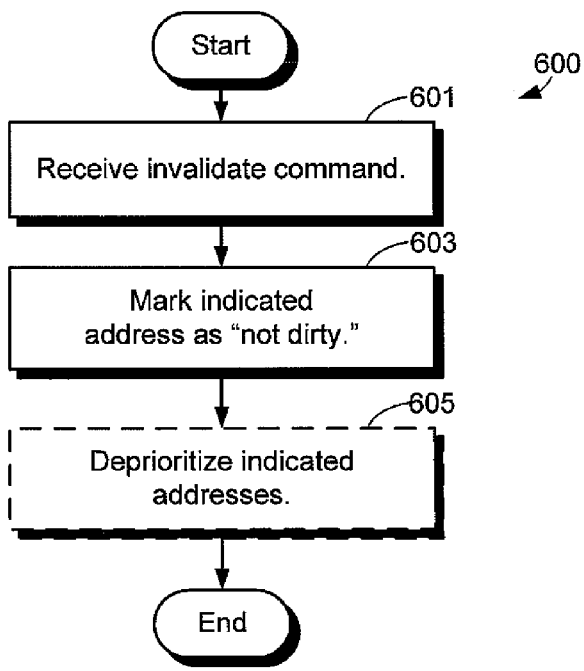
FIG. 6A is a flow chart of a method for processing an invalidate command in a computer system.
FIGS. 6B-6D illustrate a sequence of states of a cache during processing of an exemplary invalidate command.

FIG. 6A is a flow chart of a method 600 performed by a cache controller for processing an invalidate command. Method 600 may be performed in a computer system by operating a cache controller such as, for example, cache controller 140 of computer system 100 shown in FIG. 1A.

At step 601, the cache controller receives an invalidate command. The invalidate command may specify one or more addresses to be invalidated. The addresses may be indicated in ways similar to in a deprioritize command. Though, addresses may be specified in any suitable way.

At step 603, the addresses indicated by the invalidate command are marked as "not dirty". As discussed above, not dirty addresses are not written back to the main memory. Thus, the invalidate command may reduce use of memory bus bandwidth and or processing delays.

At step 605, the addresses are optionally deprioritized. The deprioritization may be done in ways similar to those described at step 503 of method 500 (FIG. 5A). The invalidated blocks, for example, may be given the lowest possible priority so that they will be evicted when cache controller next requires a block to cache new data. Though, in some alternative embodiments, the invalidated blocks may be invalidated immediately. After step 605, method 600 ends.

FIGS. 6B-6D illustrate an example operation of cache 130 when an invalidate command is received. As shown in FIG. 6B, in this example, mapping 156 is represented by a four-column table. The priority is given in column 610, the cache block is identified in column 611, the mapped address is shown in column 612, and whether the block is dirty is shown in column 613.

FIG. 6B represents the state of cache 130 before receiving an invalidate command. As shown in FIG. 6B, block 0 has priority "3" and contains dirty data mapped to address 2, block 1 has priority "2" and contains dirty data mapped to address 4, block 2 has priority "1" and contains not dirty data mapped to address 5, and block 3 has priority "0" and contains not dirty data mapped to address 3.

Assume an invalidate command is received specifying address 2 to be invalidated (see step 601, FIG. 6A). As shown in FIG. 6C, the cache block mapping to address 2 (i.e., block 0) is updated to indicate the block is not dirty (see step 603).

FIG. 6D illustrates cache 130 after address 2 has been deprioritized. Specifically, address 2 has been reprioritized to the lowest priority, in this example, priority 0. The priority of the other cached addresses has also been changed accordingly.

Another command the cache controller may receive is a zeroing command. The zeroing command sets the data of a specified address range to a default value, for example, zero. A zeroing command may be implemented in any suitable way.

Figure 7C:
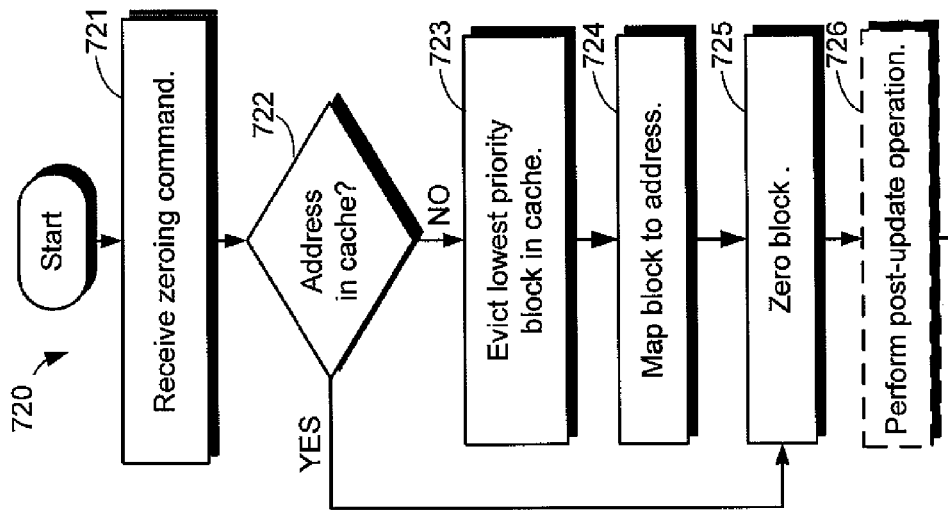
FIG. 7C is a flow chart of an alternative method for processing a zeroing command in a computer system.
Figure 7B:
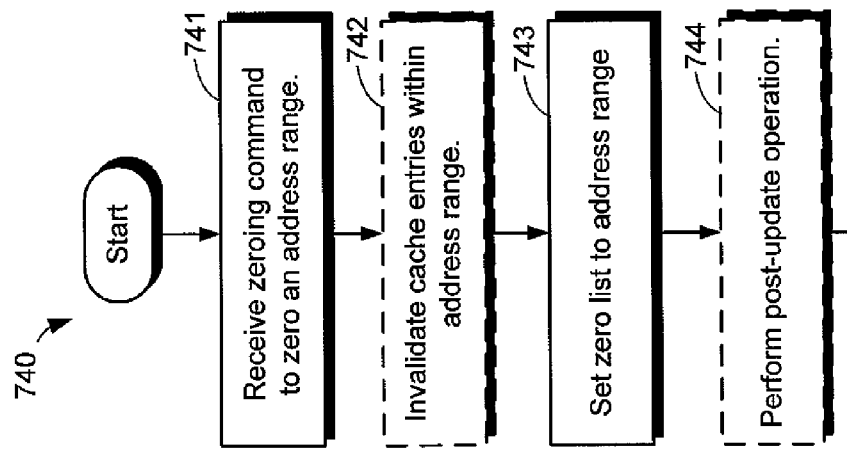
FIG. 7B is a flow chart of an alternative method for processing a zeroing command in a computer system.
Figure 7A:
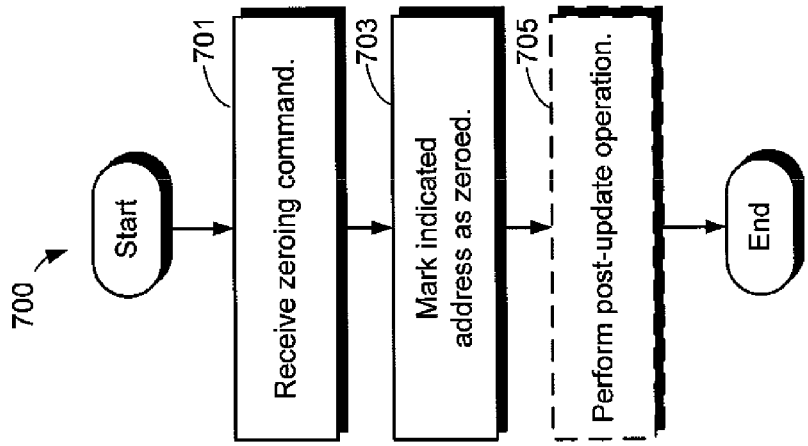
FIG. 7A is a flow chart of a method for processing a zeroing command in a computer system.

FIG. 7A is a flow chart of a method 700 performed by a cache controller for processing a zeroing command according to some embodiments. Method 700 may be performed in a computer system by operating a cache controller such as, for example, cache controller 140 of computer system 100 shown in FIG. 1A.

At step 701, a zeroing command is received. The zeroing command may specify data at one or more addresses be set to the default value. In some embodiments, the value may be specified by the zeroing command, another command, or may be fixed.

At step 703, the addresses specified by the zeroing command are marked as "zeroed". The addresses may be marked as zeroed in any suitable way. In some embodiments, the addresses may be mapped to cache blocks and a zero bit corresponding to each address may be marked (see zero bit 155 in FIG. 1A). The zero bit may indicate that data at the address should be read as having the default value, not the actual value stored by the cache block. In such an embodiment, a cache controller may provide a zero value when a zeroed value is accessed, whether that access is part of a read from a processor or a write back to main memory.

At step 705, additional update steps may optionally be performed. For example, if a block containing a zeroed address is evicted from the cache, the default value may be written to the block in the main memory at the mapped address.

FIG. 7B is a flow chart of a method 740 performed by a cache controller for processing a zeroing command according to some alternative embodiments. Method 740 may be performed by a cache that zeroes using a zero list of addresses. The cache controller may supply, in response to a read operation at a data at addresses in the zero list, the default value.

Specifically, information used by the cache for mapping may include a global zero list rather than a zero bit for each cached block. The zero list may include addresses that are not otherwise cached by a cache block. If an addresses in the zero list is subsequently written to, it may be removed from the zero list. In embodiments where an address may be in the zero list and also mapped to a cache block, the cache controller may search the zero list when determining whether an address is cached before searching the mapped addresses.

At step 741, a zeroing command is received by the cache controller. The zeroing command specifies one or more addresses, to be zeroed. For example, the addresses may be specified as a range.

At step 742, any cache blocks mapped to addresses to be zeroed are optionally invalidated.

At step 743, the addresses are added to a zero list. The addresses may be specified in the zero list individually, by one or more ranges, or in any suitable way or combination of ways.

At step 726, any additional post-update steps, such as a lazy write of zeros into main memory locations on the zero list, may be optionally performed. After step 726, method 740 ends.

FIG. 7C is a flow chart of a method 720 for processing a zeroing command according to some alternative embodiments. A zeroing bit for cache blocks mapped to addresses that are zeroed is set by method 720. Subsequent reads of data at the address will return the default value until the address is written to and the zeroing bit is reset.

At step 721, a zeroing command is received. The zeroing command may specify one or more addresses for which the data is to be zeroed. In some embodiments, the zeroing command further specifies the default value. Steps 722-726 are performed for each address for which the data is to be zeroed. The steps may be performed for each address simultaneously, sequentially, or in any suitable way.

At step 722, a determination is made whether the address for which the data is to be zeroed is cached.

When the address is cached, method 720 continues to step 725, described below.

When the address is not cached, method 720 continues to step 723 where, if there are no available cache blocks, the lowest priority address is evicted from the cache.

At step 724, the mapped address for the cache block evicted at step 723 is updated to the address for which the data is to be zeroed.

At step 725, all of the locations in the cache block mapped to the address for which the data is to be zeroed may be set to the default value, such as zero. This step may be performed by actually writing data into the block. Alternatively, this step may be performed similar to a move operation. However, rather than moving data associated with a source address in the main memory, the source of the data may be a cache block that was previously filled with zero values. Such a pre-zeroed cache block, for example, may be created by cache controller while it is otherwise idle.

At step 726, any additional update steps, such as those discussed above following a move operation, may optionally be performed. Method 720 ends after all addresses for which the data is to be zeroed have been processed.

Figure 8A:
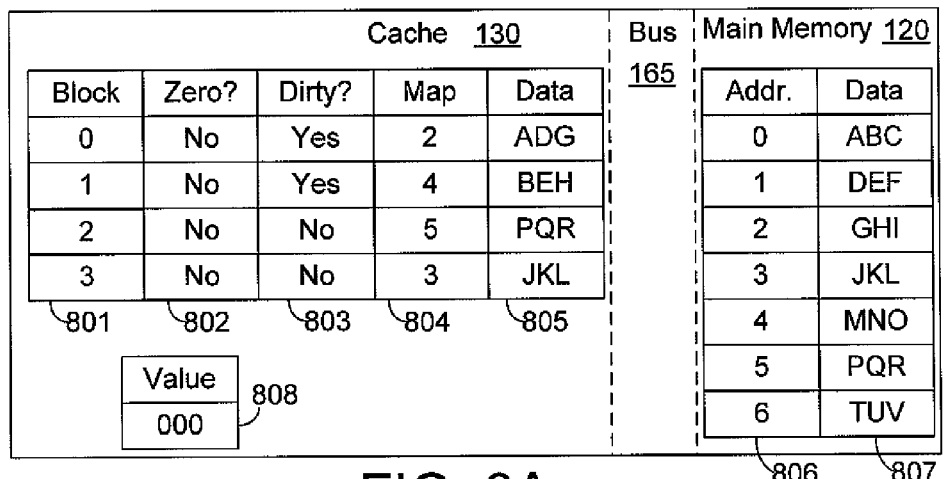
FIGS. 8A-8C illustrate a sequence of states of a cache, bus and main memory during processing of an exemplary zeroing command in accordance with the method shown in FIG. 7C.
Figure 8B:
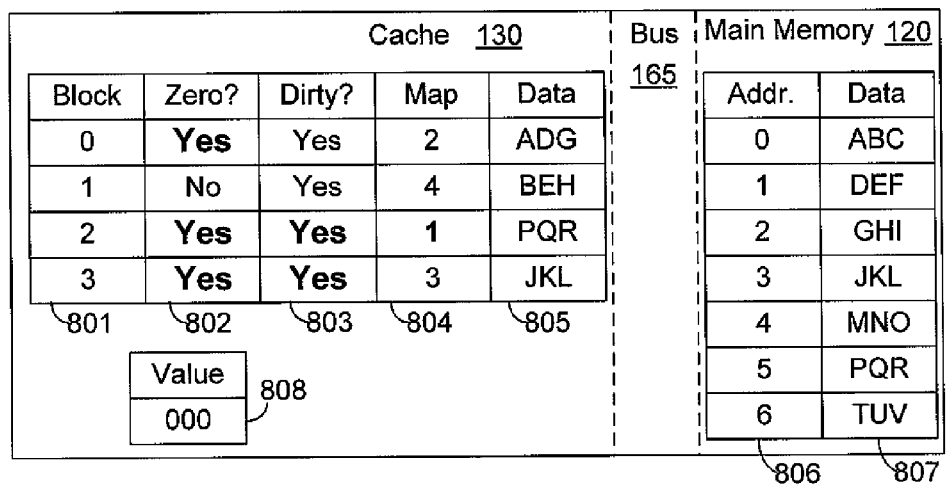
Figure 8C:
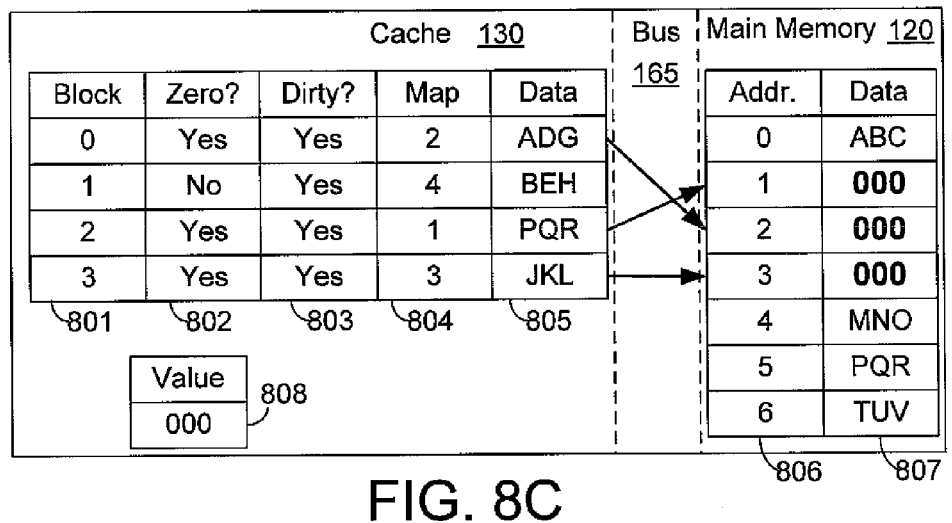

FIGS. 8A-8C illustrate an example of states of a cache 130, memory bus 165, and main memory 120 when a zeroing command has been received and processed according to method 700.

FIG. 8A illustrates the initial states of cache 130 and main memory 120. In each figure, the cache memory is represented by a five column table. Columns 801 through 804 represent entries in a portion of the cache mapping. Specifically, column 801 identifies the cache block, column 802 specifies whether a zeroing bit is set, column 803 specifies whether the block is dirty, and column 804 specifies the mapped address. Column 805 provides the data stored in each cache block corresponding to the identified cache block. Main memory 120 is represented by an address column 806 and a data column 807. A default value 808 is also stored by cache 130. Default value 808 may be "hard wired" into cache 130, or may be settable by a command. Default value 808 is the value read when any block marked as zeroed in column 802 is read.

Initially, as shown in FIG. 8A, cache block 0 is mapped to address 2, is dirty, and stores data "ADG"; block 1 is mapped to address 4, is dirty, and stores data "BEH"; block 2 is mapped to address 5, is not dirty, and stores data "PQR"; and block 3 is mapped to address 3, is not dirty, and stores data "JKL". In this example, default value 808 is fixed with data "000".

Assume a zeroing command is received by cache 130, specifying addresses 1-3 as addresses for which the data is to be zeroed. As shown in FIG. 8A, only address 2 and 3 are cached.

Accordingly, address 1 is loaded into cache 130. FIG. 8B shows that address 5 is evicted from block 2 in accordance with a suitable cache algorithm. Block 2 is remapped to address 1. Note that data from address 1 need not actually be read from main memory 120, as the zeroing operation overwrites the data, regardless.

With each of address 1-3 now mapped by the cache, the zero bit is set for blocks 0, 2 and 3 (mapping to addresses 2, 1 and 3, respectively). In some embodiments, the blocks are also marked as dirty as shown in FIG. 8B. Though, in some embodiments, "dirty" may be understood from the use of the zeroing bit.

FIG. 8C illustrates write back from cache 130 to main memory 120. This may be performed, for example, when the address is evicted from the cache or a lazy write operation is performed. Here it is assumed that addresses 1-3 have not been subsequently written to. The default value 808, namely "000", is written to the memory blocks in main memory 120 corresponding to the respective addresses. If, for example, one of addresses 1-3 was written to, the zero bit would be reset, the dirty bit set (if not previously), and the data written to the mapped cache block.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of caching a memory in a computing device, the method comprising:
    managing the caching of the memory by a cache controller, the cache controller having at least one hardware element, and the managing of the caching of the memory including:
        establishing a mapping for each cache block of a plurality of cache blocks of a hardware cache, each of the mappings associating a portion of the memory to a corresponding cache block of the plurality of cache blocks;
        receiving a copy command from a processor of the computing device, the copy command representing a request to copy data from a source portion of the memory to a destination portion of the memory, the source portion being associated to one or more particular cache blocks by at least one of the established mappings; and
        modifying the at least one established mapping that associates the source portion to the one or more particular cache blocks, the modifying including associating the destination portion to the one or more particular cache blocks.

2. The method of claim 1, wherein managing the caching of the memory further includes:
    receiving another copy command from the processor, the other copy command representing another request to copy data from another source portion of the memory to another destination portion of the memory, wherein the other source portion is not associated with an established mapping; and
    copying data from the other source portion into one of the plurality of cache blocks.

3. The method of claim 1, wherein modifying the at least one established mapping includes modifying the at least one established mapping during a same operating cycle of the hardware cache.

4. The method of claim 1, wherein the method further comprises:
    copying the data from the source portion of the memory to the destination portion of the memory via the hardware cache.

5. The method of claim 1, wherein the method further comprises:
    copying the data from the one or more particular cache blocks to the destination portion.

6. The method of claim 5, wherein copying the data from the one or more particular cache blocks to the destination portion includes an asynchronously lazy write of the data to the destination portion.

7. An apparatus for managing cache in a computer system, the computer system having a processor and a main memory, the apparatus comprising:
    a cache controller having at least one hardware component, wherein the cache controller is configured to:
        receive a command from the processor indicating that first data at a first address of the main memory is to be copied to a second address of the main memory;
        determine that the first data at the first address is not cached in a cache managed by the cache controller;
        load the first data from the first address of the main memory into a first block of the cache in response to the determination that the first data is not stored in the cache; and
        in response to receiving the command, remap the first block of the cache, in which the first data is stored, from the first address of the main memory to the second address of the main memory while the first data is retained in the first block of the cache.

8. The apparatus of claim 7, wherein the cache controller is further configured to:
    mark the first block of the cache storing the first data as inconsistent with second data stored at the second address in the main memory.

9. The apparatus of claim 7, wherein the cache controller is further configured to:
    write the first data from the first block of the cache to the second address of the main memory.

10. The apparatus of claim 9, wherein the cache controller is further configured to:
    write the first data in conjunction with an eviction of the first data from the first block of the cache.

11. The apparatus of claim 9, wherein the write is an asynchronously lazy write.

12. The apparatus of claim 7, further comprising:
cache memory of the cache, the cache memory including the first block.

13. The apparatus of claim 12, wherein the cache controller and the cache memory are integrated together as components of the cache.

14. An apparatus for managing memory in a computer system, the computer system having a processor and a main memory, the apparatus comprising:
a cache controller having at least one hardware component, wherein the cache controller is configured to:
establish a mapping for each cache block of a plurality of cache blocks in a cache such that each of the mappings associates an address in the main memory with an associated cache block;
receive a memory swap command from the processor;
first change a first swap mapping for a first swap cache block from a first swap address to a second swap address; and
second change a second swap mapping for a second swap cache block from the second swap address to the first swap address.

15. The apparatus of claim 14, wherein:
the first change and the second change are performed during a same operating cycle of the cache.

16. The apparatus of claim 14, further comprising:
consistency memory configured to store a plurality of consistency marks, each consistency mark indicating whether data stored in a respective cache block is consistent with data stored in the main memory at an address indicated by an association for the respective cache block.

17. The apparatus of claim 14, wherein the cache controller is further configured to:
determine that first data associated with the first swap address is not stored in the cache;
copy the first data into the first swap cache block in response to the determination that the first data is not stored in the cache;
determine that second data associated with the second swap address is not stored in the cache; and
copy the second data into the second swap cache block in response to the determination that the second data associated with the second swap address is not stored in the cache.

18. The apparatus of claim 17, wherein the cache controller is further configured to:
write the first data from the first swap cache block to the main memory via the second swap address; and
write the second data from the second swap cache block to the main memory via the first swap address.

19. The apparatus of claim 14, wherein the cache controller comprises a processing unit configured to execute instructions, embodied in microcode, for managing the main memory of the computer system.

20. The apparatus of claim 14, further comprising:
cache memory of the cache, the cache memory including the first and second swap cache blocks, wherein:
the cache controller and the cache memory are integrated together as components of the cache, and wherein:
the cache controller includes:
a processor interface configured to couple the cache controller and the processor; and
a memory interface configured to interface the cache controller to the main memory.

* * * * *